Sept. 28, 1948.  H. J. SIEKMANN ET AL  2,450,096
AUTOMATIC STEP TURNING LATHE
Filed Jan. 27, 1947  3 Sheets-Sheet 1
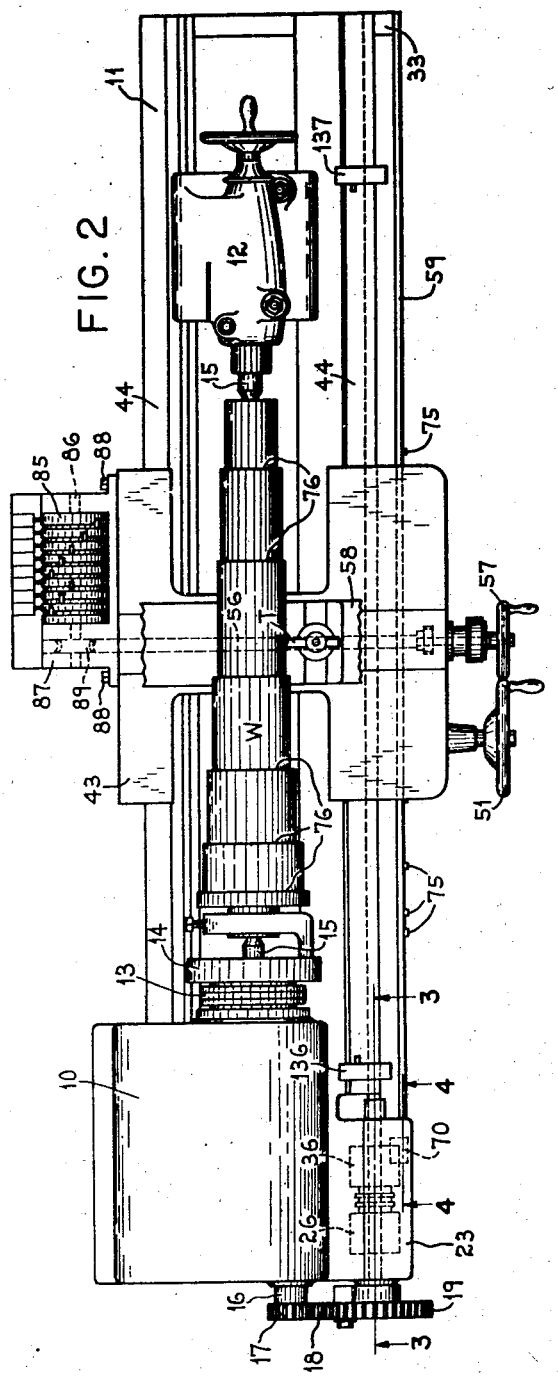
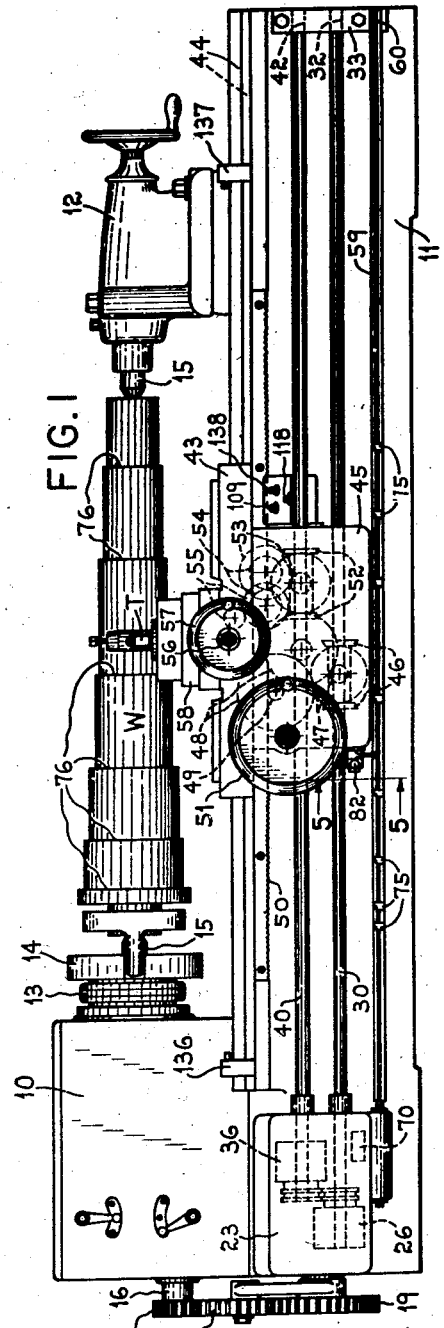
INVENTORS.
HAROLD J. SIEKMANN
AND WILLIAM A. KIMSEY
BY
Toulmin & Toulmin
ATTORNEYS.

Sept. 28, 1948.　　　H. J. SIEKMANN ET AL　　　2,450,096
AUTOMATIC STEP TURNING LATHE
Filed Jan. 27, 1947　　　　　　　　　　　　　　3 Sheets-Sheet 2
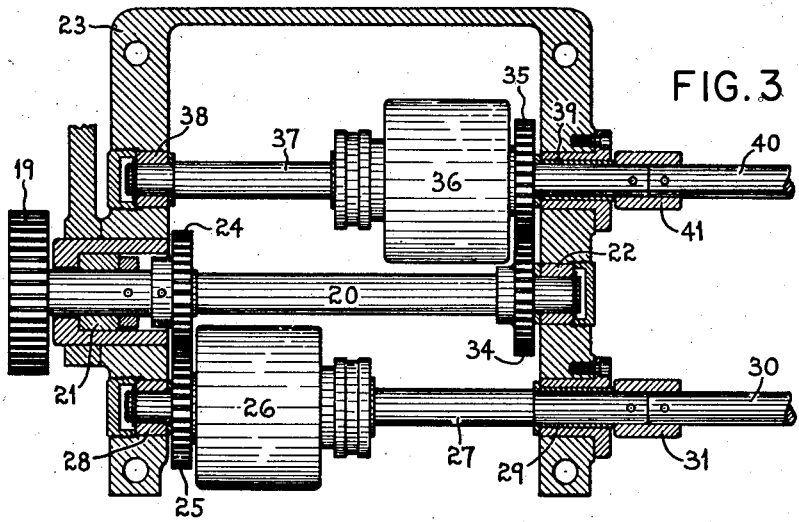
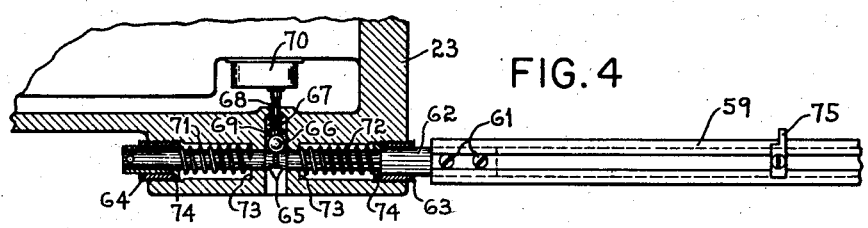
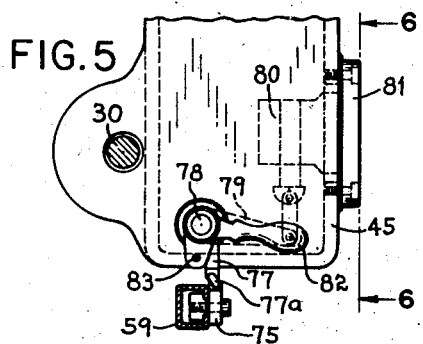
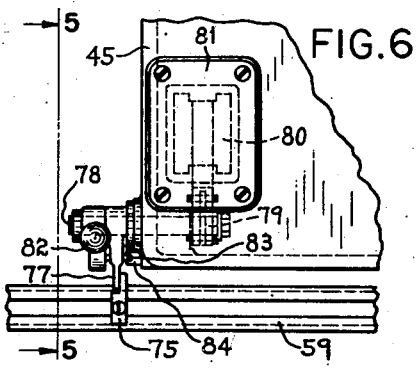
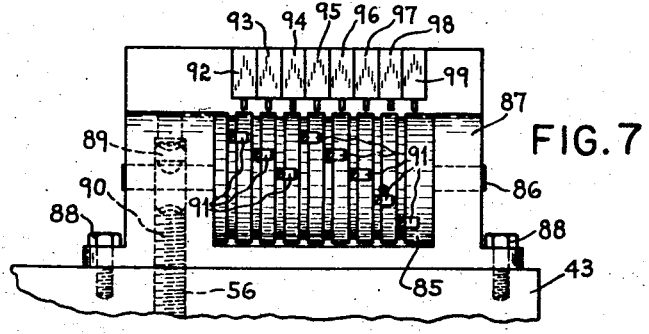
INVENTORS.
HAROLD J. SIEKMANN
AND WILLIAM A. KIMSEY
BY
ATTORNEYS.

Patented Sept. 28, 1948

2,450,096

UNITED STATES PATENT OFFICE 2,450,096

AUTOMATIC STEP TURNING LATHE

Harold J. Siekmann, Cincinnati, and William A. Kimsey, Mariemont, Ohio, assignors to The R. K. Le Blond Machine Tool Company, Cincinnati, Ohio, a corporation of Delaware Application January 27, 1947, Serial No. 724,558

8 Claims. (Cl. 82—14)

1

This invention pertains to machine tools and is particularly directed to improvements in automatic step turning lathes.

One of the objects of this invention is to provide a simplified, efficient, and easily set up automatic step turning lathe.

Another object of this invention is to provide a mechanically controlled electrical operating system for automatically controlling the movement of work and tool in a lathe to effect the turning automatically of a series of different diameter of work surfaces on a work piece in the lathe.

It is still another object of this invention to provide a step turning lathe in which the headstock transmission provides the drive power for rotating the work, actuating the carriage longitudinally of the bed, and actuating the cross slide, together with a novel electrical control mechanism for sequentially rendering the carriage and cross slide movements effective in an automatic manner to turn a series of stepped diameters on a work piece in the lathe.

It is still another object of this invention to provide a step turning lathe in which no template mechanism is required to effect the turning of any desired number, sequence, and sized steps on a work piece in an automatic manner.

Further features and advantages of this invention will appear from a detailed description of the drawings in which:

Figure 1 is a front elevation showing a step turning lathe incorporating the features of this invention.

Figure 2 is a plan view of the step turning lathe shown in Figure 1.

Figure 3 is a section on the line 3—3 of Figure 2, particularly showing the magnetic clutch operating mechanism for the carriage and cross slide movements.

Figure 4 is a fragmentary enlarged section on the line 4—4 of Figure 2 showing the longitudinal movement control limit switch and actuating trip dog bar.

Figure 5 is a fragmentary enlarged view, indicated by the line 5—5 of Figures 1 and 6 showing the manual longitudinal trip dog mechanism on the lathe apron.

Figure 6 is an enlarged fragmentary front elevation of the lower left-hand portion of the lathe apron, indicated by the line 6—6 of Figure 5.

Figure 7 is a fragmentary enlarged plan view of the cross slide control cam drum mechanism mounted on the rear end of the lathe carriage shown in Figure 2.

2

Figure 8:
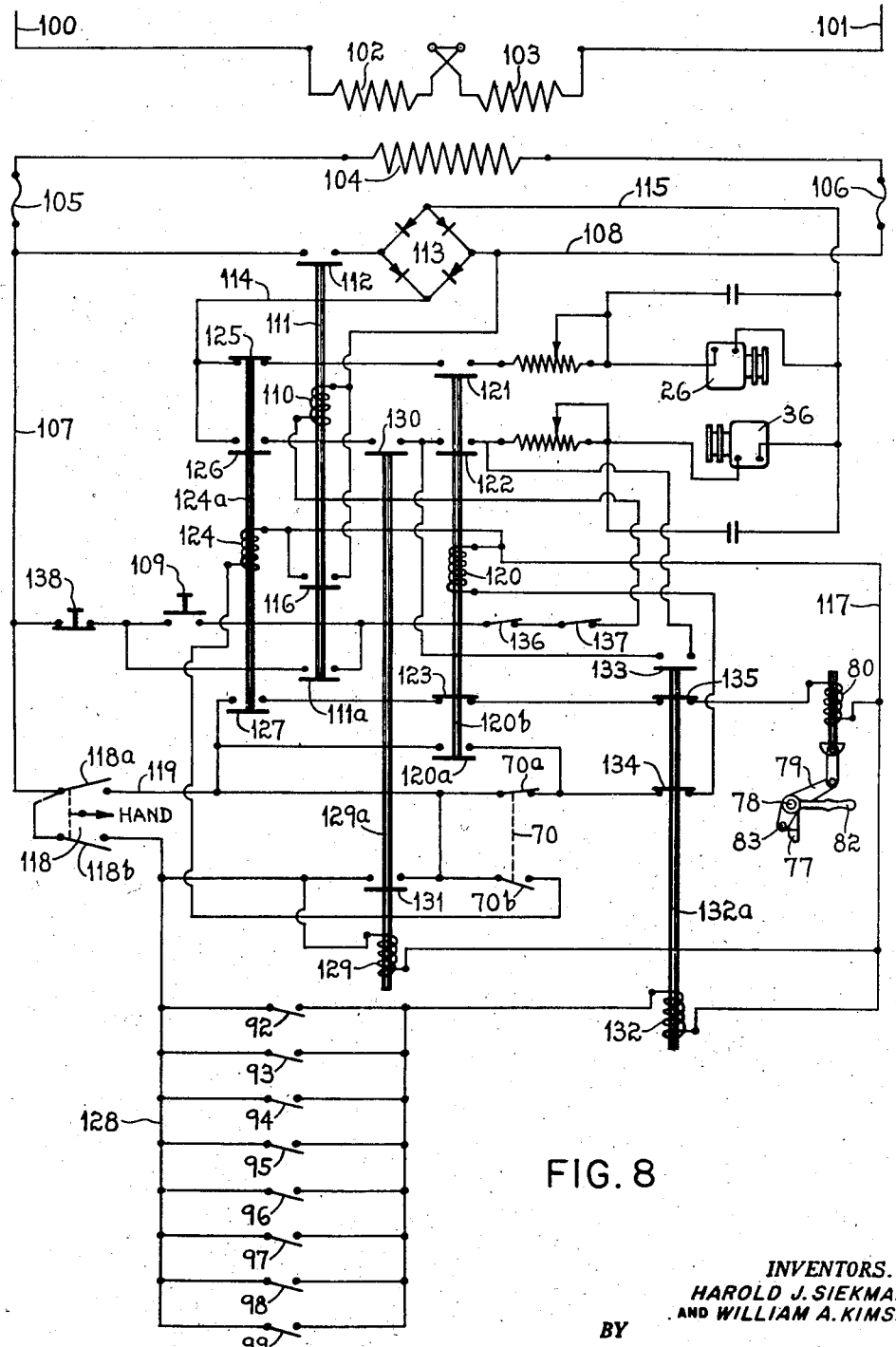

Figure 8 is an elementary wiring diagram of the control circuits associated with the step turning lathe mechanism.

As illustrative of one adaptation of this invention to a step turning lathe, there is shown a machine having a headstock 10 which is mounted in a suitable manner on the lathe bed 11 and which bed also supports a suitable tailstock 12. In the headstock 10 is the work spindle 13 having the usual face plate 14 and center 15 for supporting and driving the work piece at one end while the tailstock center 15' supports the other end of the work piece W. A suitable main drive motor (not shown) drives the headstock for rotating the work spindle 13 and the work W at the desired cutting speed.

The feed drive power for actuating the cutting tool T at appropriate feed rates relative to the work surface of the work piece W is derived from the transmission mechanism in the headstock 10 through the output shaft 16 and the gear 17 which drives through a suitable set of change gears 18 and 19 the common drive shaft 20 journaled in suitable bearings 21 and 22 in the feed box 23 mounted on the left-hand end of the bed 11, as best shown in Figures 1, 2, and 3.

On the shaft 20 is fixed a drive gear 24 which drives a gear 25 connectable through a magnetic clutch 26 to drive a shaft 27 journaled in suitable bearings 28 and 29 in the feed box 23. The carriage feed rod 30 is suitably coupled at 31 to the shaft 27 and extends longitudinally of the bed and is journaled at the right-hand end of the bed in a suitable bearing 32 carried in the block 33 fixed to the bed. Also fixed on the shaft 20 is the gear 34 which drives a gear 35 connectable by a magnetic clutch 36 to the cross slide drive shaft 37 journaled in suitable bearings 38 and 39 in the feed box 23. The cross slide feed rod 40 is coupled by a suitable coupling 41 at the feed box and is journaled at its other end in a bearing 42 in the block 33 on the right-hand end of the bed 11.

The lathe carriage 43 is movable longitudinally of the bed on suitable ways 44 and has an apron 45 containing a reversing clutch mechanism 46 which may be continuously driven by the carriage feed rod 30 for any position of the carriage and apron along the bed 11 in a well known manner. Power is transmitted from the reversing clutch mechanism 46 through suitable gearing 47 and 48 to the rack pinion 49 which operates in a conventional manner with the bed rack 50 to actuate the carriage longitudinally of the bed of the lathe. A suitable hand wheel 51 is provided for the manual rapid traversing of the carriage 43 along the bed. It is also practical to use a power rapid traverse mechanism for actuating the carriage along the bed if desired but this particular mechanism is not shown as it forms no specific part of applicants' invention.

There is also provided a reversing clutch mechanism 52 carried in the apron 45 which is continuously driven by the cross slide feed rod 40 for any position of the carriage and apron along the bed 11. Power output from this reversing clutch mechanism 52 is transmitted through suitable gearing 53, 54, and 55 to the cross feed screw 56 suitably journaled against axial movement in the carriage 43. A cross slide hand wheel 57 is provided for manual actuation of the cross slide 58 of the lathe operating through suitable nut and screw mechanism (not shown) in a well known manner.

Thus, with the headstock 10 operating and power being applied thus to the shaft 20 of the feed box 23, energizing the magnetic clutch 26 will cause the carriage to feed along the bed, its direction being determined by the appropriate setting of the reversing clutch mechanism 46. Likewise, when the magnetic clutch 36 is energized, power will be applied to actuate the cross slide in the desired in or out direction, depending upon the setting of the reversing clutch mechanism 52. The rate of feed may be determined by selecting the proper change gears 17, 18, and 19 and by varying the change gears 54 to get the desired cross slide feed rate independently of the carriage feeds. Rapid traverse mechanism may also be applied to the cross slide in addition to the manual hand wheel actuation by the hand wheel 57, if desired.

In conjunction with the longitudinal movement of the carriage, there is provided a trip dog mechanism for automatically determining the exact shoulder positions or points of stopping of the carriage travel and starting of the cross slide movement in and out radially of the work piece. This mechanism comprises a floatingly mounted dog bar 59 supported slidingly at its right-hand end in a suitable bearing 60 in the block 33 while its other end is connected by suitable screws 61 to a detent plunger 62 floatingly mounted for axial movement in bearings 63 and 64 carried in the feed box 23. Intermediate of the detent shaft 62 is formed a detent groove 65 in which operates the detent ball 66 urged toward the groove 65 by a suitable compression spring 67 operating against a switch plunger 68 having an enlarged head 69 contacting the ball 66. The outer end of the detent plunger 68 engages a micro limit switch 70 fixed to the feed box 23. Centering springs 71 and 72 engaging the abutment surfaces 73 of the feed box and engaging against abutment collar 74 behind the bearing members 63 and 64 serve to normally move the detent shaft 62 and the dog bar 59 to a centralized position, as shown in Figure 4, in which position the limit switch 70 having its contacts 70a normally closed and its contacts 70b normally open. Deflection of the dog bar 59 in either direction actuates the limit switch 70 so as to reverse this condition, namely, open contact 70a and close contact 70b.

A series of adjustable dogs 75 corresponding to the steps 76 on the work piece are engaged by an actuating dog 77, best seen in Figures 1, 5, and 6. This dog 77 is fixed to a rock shaft 78 suitably journaled against axial movement in the apron 45, the inner end of the rock shaft being connected through a lever arm 79 with a solenoid 80 carried on a suitable plate 81 fixed to the apron 45. Energizing the solenoid 80 causes the dog to swing counterclockwise, Figure 5, outwardly to release its end 77a from engagement with any of the trip dogs 75 so that the carriage may move without actuating the dog bar 59. When the solenoid 80 is de-energized, however, the dog 77 drops back by gravity to the position shown in Figure 5 so that it may engage any one of the trip dogs 75 on the dog bar 59 and move the dog bar axially to actuate the limit switch 70, Figure 4, as described. A manual control handle 82 is journaled on the rock shaft 78 and has a pin 83 adapted to engage around the back of the trip dog 77 so that when the lever is pulled upwardly, it will manually lift the dog 77 out of operative position with the trip dog 75 on the bar 59. When the handle is released, it will drop back by gravity to the position shown in Figures 5 and 6 with the pin 83 engaging a stop pin 84 carried in the apron 45.

The cross slide movements are automatically controlled by means of a cam drum 85, best shown in Figures 2 and 7, journaled by its shaft 86 in a suitable bracket 87 fixed to the rear of the carriage 43 by suitable screws 88. Fixed to the shaft 86 is a worm wheel 89 which is engaged and driven by a suitable thread 90 formed on the cross feed screw 56. A series of adjustable trip dogs 91 are provided on the periphery of the cam drum 85 which engage a series of limit switches 92 through 99, inclusive, corresponding to the various steps 76 on the work piece W. Thus, as the cross slide 58 is fed inwardly or outwardly, the cam drum 85 rotates and sequentially presents the various trip dogs 91 to the limit switches 92 to 99 for progressively inciting cross slide movement at predetermined timed relationships with the relative in and out position of the cross slide.

The operation of the machine is performed by electrical apparatus best shown in Figure 8. The current supply for operating the control apparatus may be received from suitably alternating current supply leads 100 and 101 connected to the primary windings 102 and 103 of a transformer having a secondary winding 104 connected through suitable fuses 105 and 106 to the leads 107 and 108, respectively.

With the headstock being appropriately driven and rotating the work piece W and the drive shaft 20 in the feed box 23 operating as described in conjunction with the operation of the headstock 10, the tool feed movement is started by pressing the feed start button 109 which energizes the relay 110 to close contact 111a which locks in the relay 110. Energizing relay 110 also closes contact 112 to complete a circuit to the rectifier 113 which then supplies direct current through the leads 114 and 115 for the magnetic clutches 26 and 36. Energizing relay 110 also closes contact 116 connecting lead 108 with lead 117. When this is done, contact 120a actuated by armature 120b is also closed by the energizing of relay 120.

A selector switch 118, preferably mounted on the front of the apron and carriage, as shown in Figure 1, has a neutral disconnected or hand position where it may be located when it is desired to adjust the tool by manual manipulation of the hand wheels 51 and 57 without the autmatic control apparatus functioning. The machine may be operated in a semi-automatic condition in which only the longitudinal feed of the carriage is controlled automatically and the in and out motion or adjustment of the cross slide and tool is effected manually. To set the control mechanism for this type of operation, the selector switch 118 is operated so as to move its contact 118a to interconnect lead 107 with lead 119. With contact 118a closed and the start button 109 depressed to energize relay 110, as described, the relay 120 is energized by closing of contact 120a. Energizing relay 120 closes contacts 121 and 122 supplying power to the magnetic clutches 26 and 36 and opens contact 123 to de-energize the latch solenoid 80 and allow the trip dog 77 to drop into operative position with relation to the trip dog 75 on the dog bar 59, Figure 5. Under these conditions, the relay 124 is de-energized dropping armature 124a so that its contact 125 is closed while its contact 126 is open so that only the carriage actuating magnetic clutch 26 is energized which starts the longitudinal feed movement of the lathe carriage.

This longitudinal movement of the carriage continues until the dog 77 engages one of the dogs 75 on the dog bar 59 and shifts the dog bar 59 so as to actuate the limit switch 70 which opens contact 70a. Closing contact 70b energizes relay 124 so as to open contact 125 to de-energize the magnetic clutch 26 to stop further motion of the carriage. Contact 126 is closed and contact 127 is closed but since contact 123 is open due to relay 120 being energized, the solenoid 80 is not operated to lift the latch trip dog 77 so that the dog bar 59 remains actuated to operate the limit switch 70.

Under these conditions, the cross slide may be adjusted manually by manipulating the hand wheel 57 to adjust the cutting tool relative to the work for the next diameter surface to be turned. After having thus adjusted the cross slide, a longitudinal movement may again be resumed by lifting the control handle 82, Figures 5 and 6, to release the dog 77 from one of the trip dogs 75 on the bar 59 so as to allow the bar to shift back to its centralized neutral position to release the limit switch 70 which causes contact 70a to close and causes contact 70b to open. Opening of contact 70b de-energizes relay 124, closing contact 125 to again energize the carriage control magnetic clutch 26 and start up the longitudinal feed movement again. This process may be continued for each of the respective steps 76 it is desired to cut on the work piece by appropriately setting the dogs 75 in proper relationship to the spacing desired on the work along the bar 59 and continuing the repetition of the cycle, tripping the longitudinal movement each time after manually setting the cross feed movement by lifting the control lever 82.

Both the carriage and cross slide may be operated to perform a predetermined automatic cycle for step turning the work piece W. When both the carriage and cross slide are to be controlled automatically, the selector switch 118 is moved so that its contact 118b is closed, interconnecting lead 107 with lead 128. Under these conditions, the relay 129 is energized actuating armature 129a, closing contact 130 associated with the cross slide magnetic clutch 36. Contact 131 is also closed upon energizing of relay 129. Relay 124, however, remains de-energized because contact 70b is open so that the contact 125 remains closed to apply power to the carriage magnetic clutch 26 to effect the carriage movement longitudinally of the work.

Closing of contact 131 energizes relay 120 to close contacts 120a, 121, and 122 in the supply leads to the magnetic clutches 26 and 36. Energizing relay 120 opens contact 123 and closes locking contact 120a to hold the relay 120 in circuit around the contact 70a of the limit switch 70.

Longitudinal movement of the carriage continues until the trip dog 77 engages the next dog 75 on the dog bar 59 to again actuate the limit switch 70 so as to open contact 70a and close contact 70b. Closing of contact 70b energizes relay 124, opening contact 125 to de-energize the carriage feed magnetic clutch to stop the carriage movement and closes contact 126 in the circuit to the cross slide magnetic clutch 36 and also closes contact 127.

The cross slide movement is thus initiated and continues until a trip dog 91 on the cam drum 85 operable by the rotation of the cross feed screw during the cross slide movement engages a limit switch such as the limit switch 92 whereupon the relay 132 is energized actuating armature 132a, closing contact 133 in the supply line to the cross feed magnetic clutch opens contact 134 to de-energize relay 120 which opens contacts 121 and 122 and closes contact 123 and opens contact 120a. Energizing of the relay 132 also opens contact 135 so that the solenoid 80 is de-energized and the dog 77 remains in its lowered position to engage a dog 75 on the dog bar 59.

Under these conditions, the limit switch 70 is so actuated that its contact 70b remains closed to energize the relay 124 to close contact 127, to open contact 125 and close contact 126. Further movement of the cross slide relieves the dog 91 from limit switch 92 so that relay 132 is again de-energized, closing contact 135 with the result that the solenoid 80 is energized to raise the dog 77 and control handle 82 to allow the dog bar 59 to neutralize itself again so as to operate the limit switch 70 to close contact 70a and open contact 70b which again institutes the carriage movement in a longitudinal movement after having automatically repositioned the cross slide. The next step portion of the work piece is then turned until the dog 77 again hits a dog 75 on the bar 59 to again institute cross slide movement as described. This cycle of operation is repeated until all of the various step portions of the work piece W are completed automatically, there being a series of limit switches 92, 93, 94, 95, 96, 97, 98, and 99 and corresponding trip dogs 91 to effect the stopping of the cross slide movement and the automatic institution of the longitudinal carriage movement after the cross slide has been positioned to the proper diameter of the work surface for each step to be cut.

Normally closed safety limit switches 136 and 137 are engaged by the leftward and rightward movement of the carriage, respectively, mounted on the bed of the machine serve to automatically de-energize the relay 110 so as to open contacts 111, 112, and 116 to de-energize the automatic control circuit and to prevent any false operation of the machine when the carriage is moved to the extreme edge of the lathe bed or to any intermediate restricted positions depending upon the setting of the limit switches 136 and 137 along the bed. These switches are utilized to stop the cycle at the end of the machining operation in either direction of travel.

The entire machine may be stopped at any time by depressing the stop button 138 so as to similarly de-energize the relay 110 with the same results of cutting out the control circuits by opening contacts 111, 112, and 116.

There has been provided a transmission and control mechanism for automatically regulating the tool movement in a step turning lathe in which the headstock transmission furnishes the power supply for rotating the work, actuating the carriage in longitudinal movement, and actuating the cross slide in radial in or out feed movements, and in which there is provided an electrical control system for automatically sequentially controlling the carriage and cross slide movements in a predetermined cycle of operation for effecting automatically a series of step turning operations on a work piece in the lathe.

While the apparatus herein disclosed and described constitutes a preferred form of the invention, it is to be understood that the apparatus is capable of mechanical alteration without departing from the spirit of the invention and that such mechanical arrangements and commercial adaptations as fall within the scope of the appendant claims are intended to be included herein.

Having thus fully set forth and described this invention, what is claimed as new and desired to be secured by United States Letters Patent is:

1. In a step turning lathe having a headstock, a work spindle in said headstock including means for supporting and rotating a work piece in said lathe, a feed drive transmission actuated by said headstock, a pair of magnetic clutches driven from said feed transmission, a cariage feed rod journaled longitudinally of the bed of said lathe connectable or disconnectable to be driven from said feed transmission by one of said magnetic clutches, a cross slide feed rod journaled longitudinally of the front of said bed of said lathe adapted to be connected or disconected through the other of said magnetic clutches to said feed transmission, reversing mechanisms in said apron operably connected to be driven from said feed rods for any position of relative movement of the apron and carriage of said lathe on said bed, means for connecting power from one of said reversing mechanisms associated with the carriage feed screw to actuate the rack pinion in the apron of said lathe to effect longitudinal feeding movements of the carriage along the bed, and further gear transmission means connecting said other reverser mechanism associated with the cross slide feed rod to the cross feed screw of said lathe for effecting transverse movements of the cross slide, and electrical control mechanism operated by the relative movement of the carriage and cross slide for energizing and de-energizing said magnetic clutches in a predetermined sequential order to effect a step turning operation of a cutting tool on the cross slide of said lathe on a work piece mounted on the work spindle.

2. In a step turning lathe having a headstock and a tailstock for supporting and rotating a work piece in said lathe, a feed box on the bed of said lathe including a common drive shaft and a pair of magnetic clutches driven therefrom, a feed power transmission from said headstock to said common drive shaft, a carriage feed rod extending longitudinally the front of the bed connected to be actuated through one of said magnetic clutches, a cross slide feed rod mounted longitudinally the front of the bed adapted to be connected or disconnected from said common drive shaft by the other of said magnetic clutches, and electrical control means for sequentially operating said magnetic clutches including a limit switch in said feed box, a longitudinally actuable dog bar extending longitudinally the front of said bed including dogs adjustably mounted thereon and a trip dog on the apron of said lathe for actuating said dog bar to control the operation of said limit switch in the feed box, and further electrical control means comprising a cam drum rotatably mounted on the carriage and actuable by the rotation of the cross feed screw including a series of trip dogs on said cam drum and a series of limit switches actuable by said trip dogs and electrical control relay means actuable by said limit switch in the feed box and the limit switches on said carriage for effecting a step turning operation of a cutting tool on a work piece in said lathe.

3. In a step turning lathe having a carriage and a cross slide, electrical control means for sequentially effecting the operation of said carriage or cross slide to perform a step turning operation including magnetic clutch means for applying power from the headstock of said lathe to actuate the carriage or cross slide movements, a limit switch actuable by the carriage movement along the bed for arresting the carriage movement by operating electrical control mechanism to de-energize said magnetic clutch means for effecting carriage movement, further electrical control means comprising a cam drum having a series of trip dogs and limit switches associated with said trip dogs actuable by the rotation of the cross feed screw for arresting cross slide movement at predetermined radial positions relative to the work axis, and electric selector switch means to cause said lathe to operate with the control of the limit switch confined to carriage movement while said cross slide control cam drum mechanism is inoperative, said selector means being adjustable to another position whereby both the carriage actuated and cross feed screw actuated electrical control mechanism operates jointly to automatically effect a step turning movement for the cutting tool of the lathe.

4. In a step turning lathe having a carriage and a cross slide, electrical control means for sequentially effecting the operation of said carriage or cross slide to perform a step turning operation including magnetic clutch means for applying power from the headstock of said lathe to actuate the carriage or cross slide movements, a limit switch actuable by the carriage movement along the bed for arresting the carriage movement by operating electrical control mechanism to de-energize said magnetic clutch means for effecting carriage movement, further electrical control means comprising a cam drum having a series of trip dogs and limit switches associated with said trip dogs actuable by the rotation of the cross feed screw for arresting cross slide movement at predetermined radial positions relative to the work axis, and electric selector switch means to cause said lathe to operate with the control of the limit switch confined to carriage movement while said cross slide control cam drum mechanism is inoperative, said selector means being adjustable to another position whereby both the carriage actuated and cross feed screw actuated electrical control mechanism operates jointly to automatically effect a step turning movement for the cutting tool of the lathe, said selector switch means having a hand position whereby both of said electrical control mechanisms actuable by the cross feed screw are rendered inoperative for manual manipulation of the carriage and cross slide movements.

5. In an electrical control mechanism for a step turning lathe, a magnetic clutch for applying power to actuate the carriage in longitudinal movement, a second magnetic clutch controlling the application of power to the cross slide of the lathe, a limit switch actuable by the movement of the carriage to predetermined positions for de-energizing the magnetic clutch applying power to actuate the carriage movement, and control means manually operable for releasing said control limit switch to again energize the magnetic clutch for actuating the carriage movement, a cam drum journaled on said carriage and driven in timed relationship with the movement of the cross slide, and control means operable by the rotation of the cam drum to arrest cross slide movement upon movement of the cross slide to predetermined in and out positions, and selector switch control means for rendering one or both of the control means for the carriage or cross slide movements effective or ineffective.

6. In an electrical control system for a step turning lathe having a carriage, a cross slide on the carriage, means for driving said carriage and cross slide from the headstock including a magnetic clutch for applying power for carriage movement, a second magnetic clutch for applying power for cross slide movement, electrical control devices including a limit switch actuable by the carriage movement to predetermined positions for de-energizing the magnetic clutch for carriage feed movement, a manually operated releasing device operable to re-energize said magnetic clutch for carriage movement, a drum cam mechanism including a series of limit switches carried on the carriage of said lathe actuable by cross slide movement to predetermined positions for stopping cross slide movement by de-energizing the magnetic clutch for applying power to the cross slide, said electrical control system including further mechanism operable in conjunction with said magnetic clutch means to automatically stop the cross slide movement and institute the longitudinal feed movement of the carriage by electrically actuating the manually controlled trip member.

7. In a step turning lathe having a headstock and a tailstock for supporting and rotating a work piece, a feed box including a pair of magnetic clutches driven from the head stock transmission, electrical control means for energizing said magnetic clutch devices for actuating the carriage and cross slide including a manually and electrically actuated trip dog carried by the apron and engaging trip dogs on a dog bar shiftable to actuate a limit switch in said feed box for de-energizing and energizing the magnetic clutch for applying power to the carriage, a cam drum switch actuating device including a series of limit switches actuable sequentially upon movement of the cross slide to predetermined in and out positions for stopping cross slide movement and rendering said electric power actuated trip mechanism operative to again institute carriage movement, and means operable by said trip member on the apron for instituting cross slide movement when the carriage movement is stopped.

8. In a step turning lathe having a headstock and a tailstock for supporting and rotating a work piece, a feed box including a pair of magnetic clutches driven from the headstock transmission, control means for energizing said magnetic clutch devices for actuating the carriage and cross slide including a manually and electrically actuated trip dog carried by the apron and engaging trip dogs on a dog bar shiftable to actuate a limit switch in said feed box for de-energizing and energizing the magnetic clutch for applying power to the carriage, a cam drum switch actuating device including a series of limit switches actuable sequentially upon movement of the cross slide to predetermined in and out positions for stopping cross slide movement and rendering said electric power actuated trip mechanism operative to again institute carriage movement, and means operable by said trip member on the apron for instituting cross slide movement when the carriage movement is stopped, and selector switch means for rendering either the carriage control trip mechanism operative alone or both said carriage trip mechanism and the cross slide cam drum trip mechanism operative simultaneously.

HAROLD J. SIEKMANN.
WILLIAM A. KIMSEY.

REFERENCES CITED

The following references are of record in the file of this patent:

UNITED STATES PATENTS

| Number | Name | Date |
|---|---|---|
| 2,032,597 | Shaw | Mar. 3, 1936 |
| 2,032,598 | Shaw | Mar. 3, 1936 |
| 2,071,180 | Shaw | Feb. 16, 1937 |
| 2,325,733 | Bickel | Aug. 3, 1943 |

FOREIGN PATENTS

| Number | Country | Date |
|---|---|---|
| 436,600 | Germany | Nov. 5, 1926 |